US011448361B1

(12) United States Patent
Dorame, Jr. et al.

(10) Patent No.: US 11,448,361 B1
(45) Date of Patent: Sep. 20, 2022

(54) FOLDABLE STAND ASSEMBLY

(71) Applicants: Larry Dorame, Jr., Tucson, AZ (US); Victor Edgardo Borquez, Marana, AZ (US)

(72) Inventors: Larry Dorame, Jr., Tucson, AZ (US); Victor Edgardo Borquez, Marana, AZ (US)

( * ) Notice: Subject to any disclaimer, the term of this patent is extended or adjusted under 35 U.S.C. 154(b) by 0 days.

(21) Appl. No.: 17/508,990

(22) Filed: Oct. 23, 2021

(51) Int. Cl.
*F16M 11/24* (2006.01)
*F16M 11/38* (2006.01)

(52) U.S. Cl.
CPC ........... *F16M 11/38* (2013.01); *F16M 11/242* (2013.01); *F16M 11/245* (2013.01)

(58) Field of Classification Search
USPC ......... 108/115, 126, 129, 130; 254/3 C, 4 C, 254/5 C, 10 C, 93 L; 248/157, 419, 420, 248/421, 423, 424, 188.2, 188.6
See application file for complete search history.

(56) References Cited

U.S. PATENT DOCUMENTS

| | | | | |
|---|---|---|---|---|
| 4,032,103 A | * | 6/1977 | Ehrichs | A47B 9/16 248/421 |
| 4,700,921 A | * | 10/1987 | Holbrook | B63B 29/04 248/421 |
| 5,769,396 A | * | 6/1998 | Tischendorf | B62M 3/00 254/134 |
| 5,927,689 A | * | 7/1999 | Johnson | B25H 1/0014 254/131 |
| 2005/0017223 A1 | | 1/2005 | Lucas | |
| 2008/0224014 A1 | | 9/2008 | Piri | |
| 2015/0028177 A1 | | 1/2015 | Vargas | |
| 2020/0009716 A1 | | 1/2020 | LaSalle | |

OTHER PUBLICATIONS

"Jeep JK Jack Base by AEV," azoffroading.com. https://azoffroading.com/blog/jeep-jk-jack-base-by-aev/ [Date accessed: Jun. 8, 2021].

* cited by examiner

*Primary Examiner* — Alfred J Wujciak
(74) *Attorney, Agent, or Firm* — Houda El-Jarrah; Bold IP, PLLC

(57) ABSTRACT

A foldable stand assembly is provided. The assembly includes a base adapted to rest on a ground surface, a platform positionable above the base adapted to hold a separate apparatus (e.g., a vehicle jack), and a set of support arms extending between the base and the platform to support the overall assembly. The base includes a U-shaped channel into which the support arms and at least a portion of the platform may be received when the stand is folded for stowage. Accordingly, the stand assembly may be folded into a compact configuration for stowage and unfolded into an upright configuration for use.

21 Claims, 8 Drawing Sheets

FOLDABLE STAND ASSEMBLY

FIELD OF THE INVENTION

This invention relates to stands, including a stand that transitions from a folded configuration for stowage to an extended configuration for use.

BACKGROUND

As is known in the art, when a tire of a vehicle becomes flat, the vehicle may be lifted (e.g., using a vehicle jack) such that the flat tire may be removed and replaced with a fully inflated tire. In many cases, the jack is positioned between the ground and the vehicle's axle to lift the vehicle. Most vehicles are sold including standard sized jacks that work with each respective factory equipped vehicle.

However, off-road vehicles such as trucks may have larger diameter "aftermarket" tires with larger diameters. Having larger diameters, the larger tires may elevate the vehicle's axles higher off the ground for traveling off-road.

However, because the larger diameter tires elevate the vehicle's axles higher off the ground, the standard sized jack provided with the vehicle from the factory may not extend high enough to reach and/or adequately lift the vehicle's elevated axle when a flat tire may occur.

Accordingly, there is a need for a stand that may be placed between a standard sized jack and the ground to elevate the jack when needed to lift vehicles with higher elevated axles. There also is a need for a stand that may fold into a compact configuration for stowage within the vehicle's trunk when not needed.

SUMMARY

According to one aspect, one or more embodiments are provided below for a foldable stand assembly comprising a base with a base first end, a base second end, and a U-shaped channel extending from the base first end to the base second end, a platform with a platform first end, a platform second end and a platform top side extending between the platform first end to the platform second end, at least one first elongate support arm with a first end rotatably coupled to the base first end and a second end rotatably coupled to the platform first end, and at least one second elongate support arm with a first end adapted to be releasably coupled to the base and a second end rotatably coupled to the platform second end, wherein the foldable stand transitions from a first configuration with the first end of the at least one second elongate support arm releasably coupled to the base, to a second configuration with the first end of the at least one second elongate support arm uncoupled from the base and with the at least one first elongate support arm and at least a portion of the platform received into the U-shaped channel.

In another embodiment, the base includes a rear side wall, a top side, and a front side wall that define the U-shaped channel.

In another embodiment, the at least one first elongate support arm includes a total of two first elongate support arms, and the at least one second elongate support arm includes a total of two second elongate support arms.

In another embodiment, the total of two first elongate support arms are coupled together by a first support beam, and the total of two second elongate support arms are coupled together by a second support beam.

In another embodiment, the first end of the at least one first elongate support arm is rotatably coupled to the base first end by a first pin passing through a first aperture in the base.

In another embodiment, the second end of the at least one first elongate support arm is rotatably coupled to the platform first end by a second pin passing through a first aperture in the platform.

In another embodiment, the first end of the at least one second elongate support arm is releasably coupled to the base by a first tab coupled to the first end of the at least one second elongate support arm and resting in a first notch in the base.

In another embodiment, the first tab includes a third pin coupled to the first end of the at least one second elongate support arm.

In another embodiment, the second end of the at least one second elongate support arm is rotatably coupled to the platform second end by a fourth pin passing through a second aperture in the platform.

In another embodiment, the foldable stand assembly further comprises at least one ear tab coupled to and extending upward from the platform top side.

In another embodiment, a cross-section of the at least one first elongate support arm includes an L-shaped cross-section.

In another embodiment, a cross-section of the at least one second elongate support arm includes an L-shaped cross-section.

According to another aspect, one or more embodiments are provided below for a foldable stand assembly comprising a base with a base first end, a base second end, a base top side, a rear side wall extending upward from the base top side, a front side wall extending upward from the base top side, and a U-shaped channel defined by the rear side wall, the base top side, and the front side wall, a platform with a platform first end, a platform second end, and a platform top side extending between the platform first end to the platform second end, a first elongate support arm with a first end rotatably coupled to the base first end and a second end rotatably coupled to the platform first end, a second elongate support arm with a first end rotatably coupled to the base first end and a second end rotatably coupled to the platform first end, a third elongate support arm with a first end adapted to be releasably coupled to the base second end and a second end rotatably coupled to the platform second end, and a fourth elongate support arm with a first end adapted to be releasably coupled to the base second end and a second end rotatably coupled to the platform second end, wherein the foldable stand transitions from a first configuration with the first end of the first elongate support arm and the first end of the second elongate support arm releasably coupled to the base second end, to a second configuration with the first end of the first elongate support arm and the first end of the second elongate support arm uncoupled from the base second end and with the first elongate support arm, the second elongate support arm and at least a portion of the platform received into the U-shaped channel.

In another embodiment, the first end of the first elongate support arm and the first end of the second elongate support arm are rotatably coupled to the base first end by a first pin passing through a first aperture in the base first end.

In another embodiment, the second end of the first elongate support arm and the second end of the second elongate support arm are rotatably coupled to the platform first end by a second pin passing through a second aperture in the platform first end.

In another embodiment, the first end of the third elongate support arm is releasably coupled to the base second end by a first tab coupled to the first end of the third elongate support arm and resting in a first notch in the base second end, and the first end of the fourth elongate support arm is releasably coupled to the base second end by a second tab coupled to the first end of the fourth elongate support arm and resting in a second notch in the base second end.

In another embodiment, the first tab and the second tab include a third pin coupled to the first end of the third elongate support arm and to the first end of the fourth elongate support arm.

In another embodiment, the second end of the third elongate support arm and the second end of the fourth elongate support arm are rotatably coupled to the platform second end by a fourth pin passing through a third aperture in the platform second end.

In another embodiment, the foldable stand assembly comprises at least one ear tab coupled to and extending upward from the platform top side.

In another embodiment, the at least one ear tab includes a total of two ear tabs, with a first ear tab coupled to the platform top side at a rear location on the platform top side and a second ear tab coupled to the platform top side at a forward location on the platform top side.

Other aspects and advantages of the invention will be apparent from the following description and the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the foldable stand assembly according to exemplary embodiments hereof provides a foldable support and riser extension for separate apparatuses, such as, e.g., standard-sized vehicle jacks. Standard-sized jacks are oftentimes too short for lifting off-road vehicles with large diameter tires. Accordingly, when unfolded, extended and in its first configuration for use, the assembly may be placed beneath a standard jack thereby elevating the jack above the ground (e.g., by ~6"-12"). In this way, a standard-sized jack, resting on the assembly, may reach the vehicle's axle and be used to elevate the vehicle. As will be described herein, the assembly may then be folded into its second configuration for compact stowage (e.g., in the trunk of the vehicle).

Figure 1:
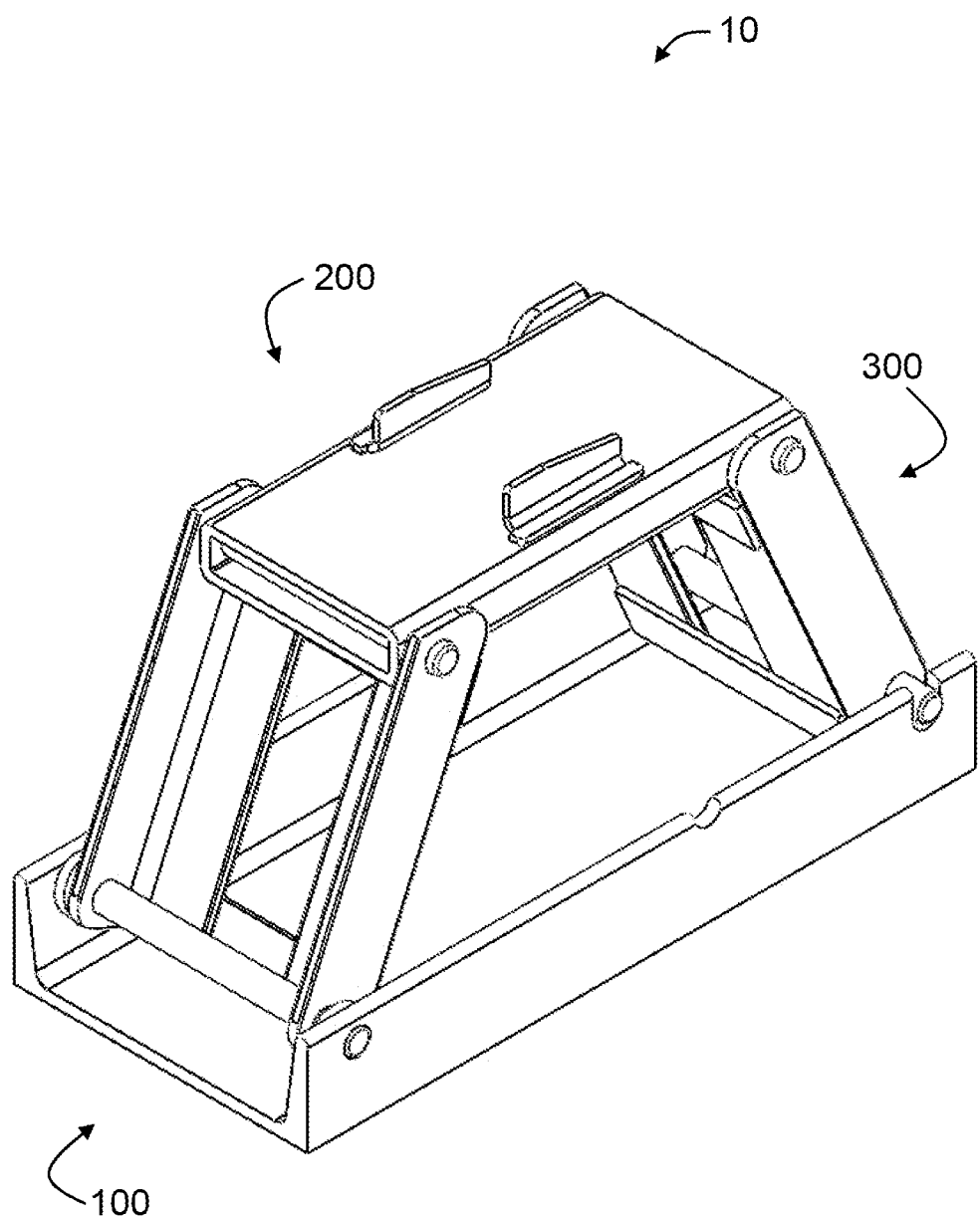
FIG. 1 shows a schematic of a foldable stand assembly according to exemplary embodiments hereof.
Figure 2:
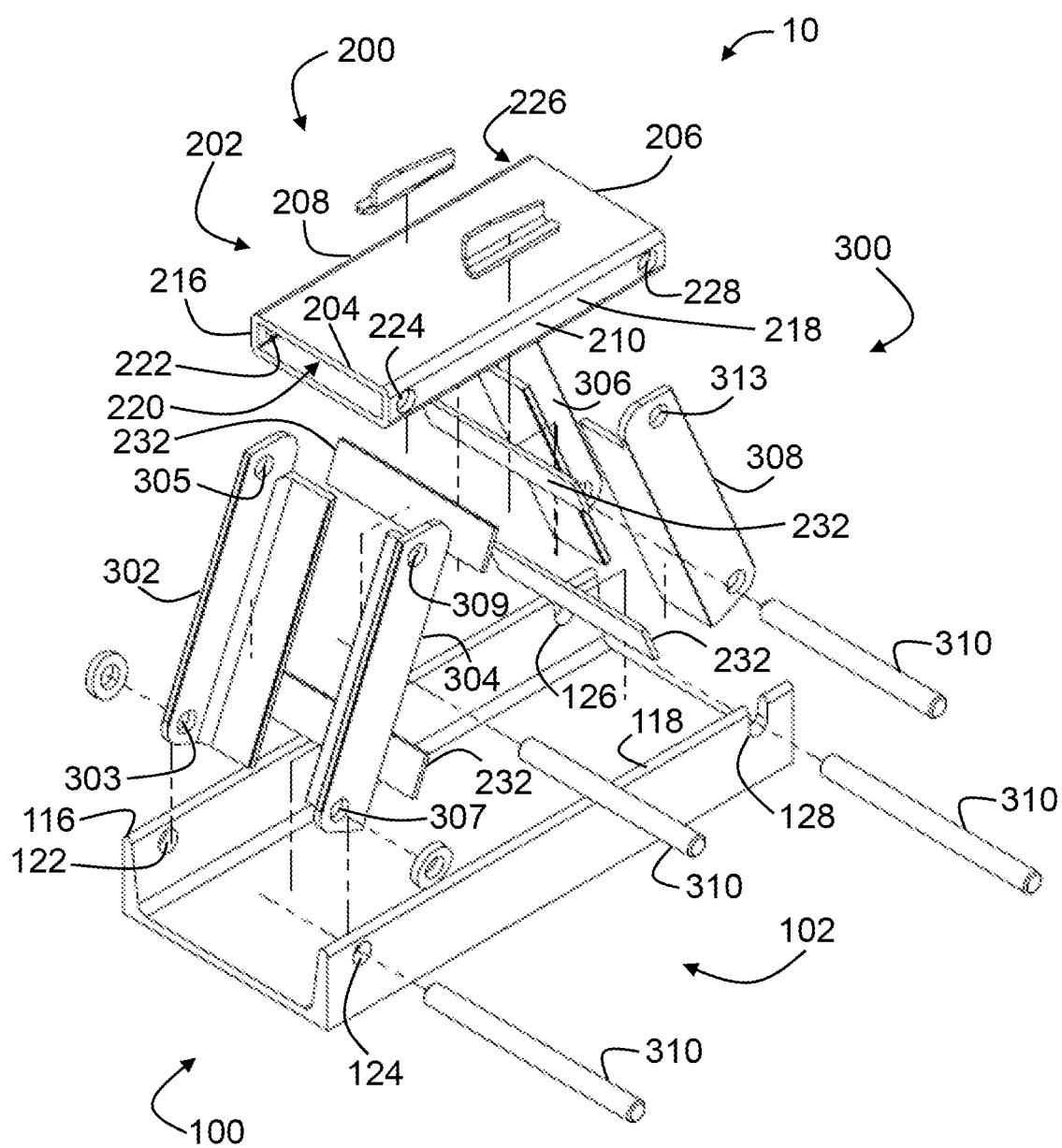
FIG. 2 shows an exploded view of the foldable stand assembly of FIG. 1 according to exemplary embodiments hereof.

In one exemplary embodiment hereof, as shown in FIGS. 1 and 2, the foldable stand assembly 10 (also referred to herein as simply the assembly 10) includes a base assembly 100, a platform assembly 200, and a support arms assembly 300. FIG. 1 shows a schematic drawing of the foldable stand assembly 10, and FIG. 2 shows an exploded view of the same. In general, the base assembly 100 provides a foundational base for the overall assembly 10, the platform assembly 200 provides a raised platform to support a separate apparatus (e.g., a vehicle jack), and the support arms assembly 300 extends between the base assembly 100 and the platform assembly 200 thereby providing support to both assemblies 100, 200.

In some embodiments as described herein (see FIGS. 5-8), the foldable stand assembly 10 is designed to transition from a first configuration (e.g., an extended configuration for use as a support stand) to a second configuration (e.g., a compact configuration for stowage).

Base Assembly 100

Figure 3:
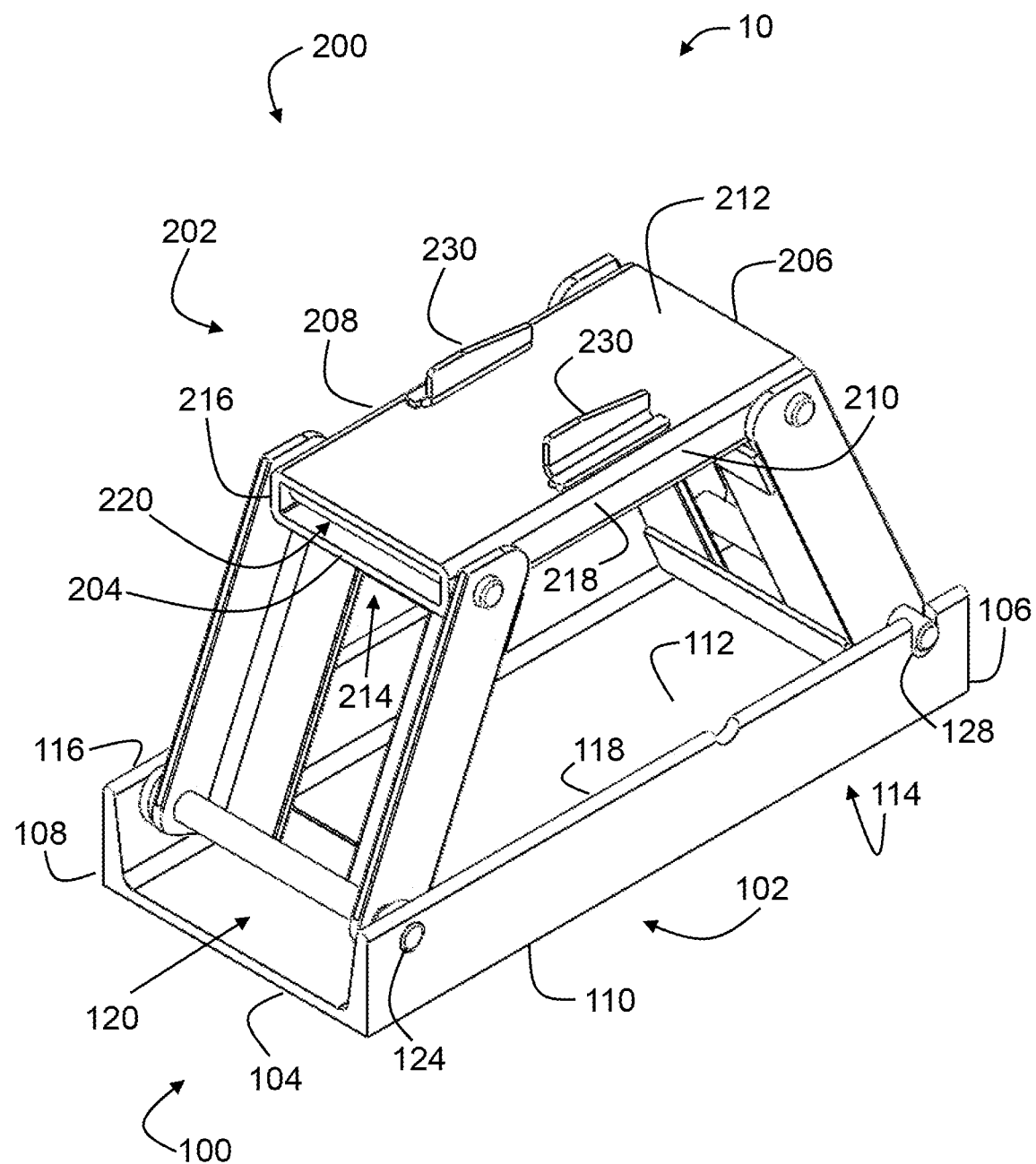
FIG. 3 shows aspects of a base assembly and of a platform assembly according to exemplary embodiments hereof.

In some embodiments as shown in FIG. 3, the base assembly 100 includes a base plate 102 with a left side 104, a right side 106, a rear side 108, a front side 110, a top side 112, and a bottom side 114. The base plate 102 also may include a rear side wall 116 generally extending upward from the rear side 108 of the base plate 102 and extending between the left side 104 and the right side 106 (or at least one or more portions thereof), and a front side wall 118 generally extending upward from the front side 110 of the base plate 102 and extending between the left side 104 and the right side 106 (or at least one or more portions thereof). The rear side wall 116, the top side 112, and the front side wall 118 define a channel 120 extending from the left side 120 to the right side 106 (or at least one or more portions thereof). In this way, the cross-section of the base assembly 100 taken from the perspective of looking directly into the left side 104 and/or directly into the right side 106 may be generally U-shaped. As will be described in other sections, the U-shaped channel 120 may receive at least a portion of the platform assembly 200 and/or the support arms assembly 300 during the folding process of the assembly 10.

In some embodiments as shown in FIG. 2, the base assembly 100 includes a first base aperture 122 passing through its rear side wall 116 and a corresponding second base aperture 124 passing through its front side wall 118. It is preferable that the first and second base apertures 122, 124 be located across the channel 120 from one another and that the apertures 122, 124 are generally opposing. In this way, as will be described in other sections, a pin 310 may extend through the first base aperture 122, across the channel 120, and through the second base aperture 124 to provide a rotational mount for the support arms assembly 300. As shown in FIG. 2, the first and second base apertures 122, 124 are preferably located towards the left side 104 of the base plate 102. This will be described in further detail in other sections.

In some embodiments as shown in FIG. 2, the base assembly 100 includes a first notch 126 in the top of its rear side wall 116 and a corresponding second notch 128 in the top of its front side wall 118. It is preferable that the first and second notches 126, 128 be located across the channel 120 from one another and that the notches 126, 128 are generally opposing. In this way, a first end of a pin 310 may be received into the first notch 126 and a second end of a pin 310 may be received into the second notch 128 to provide a mounting position for the support arms assembly 300. As shown in FIG. 2, the first and second notches 126, 128 are preferably located towards the right side 106 of the base plate 102. This will be described in further detail in other sections.

Platform Assembly 200

In some embodiments as shown in FIG. 3, the platform assembly 200 includes a top plate 202 with a left side 204, a right side 206, a rear side 208, a front side 210, a top side 212, and a bottom side 214. In some embodiments, the top plate 202 may be hollow (as depicted) and may include a rear side wall 216 and a front side wall 218. In this case, the rear side wall 216, the front side wall 218, the top side 210, and the bottom side 214 may define the interior volume 220 of the hollow plate 202. However, it also is contemplated that the top plate 202 be solid, and/or any combinations of hollow and solid.

In some embodiments as shown in FIG. 2, the platform assembly 200 includes a first platform aperture 222 passing through its rear side wall 216 and a corresponding second platform aperture 224 passing through its front side wall 218. It is preferable that the first and second platform apertures 222, 224 as shown in FIG. 2 be located across the inner volume 220 from one another and that the apertures 222, 224 are generally opposing. In this way, as will be described in other sections, a pin 310 may extend through the first platform aperture 222, through the interior volume 220 of the platform assembly 200, and through the second platform aperture 224 to provide a rotational mount for the support arms assembly 300. As shown in FIG. 2, the first and second platform apertures 222, 224 are preferably located towards the left side 204 of the top plate 202. This will be described in further detail in other sections.

In some embodiments as shown in FIG. 2, the platform assembly 200 includes a third platform aperture 226 passing through its rear side wall 216 and a corresponding fourth platform aperture 228 passing through its front side wall 218. It is preferable that the third and fourth platform apertures 226, 228 be located across the inner volume 220 from one another and that the apertures 226, 228 are generally opposing. In this way, as will be described in other sections, a pin 310 may extend through the first platform aperture 226, through the interior volume 220 of the platform assembly 200, and through the second platform aperture 228 to provide a rotational mount for the support arms assembly 300. As shown in FIG. 2, the third and fourth platform apertures 226, 228 are preferably located towards the right side 206 of the top plate 202. This will be described in further detail in other sections.

In some embodiments as shown in FIGS. 2 and 3 the top plate 202 includes at least one (and preferably two) ear tabs 230 (which are visible in FIG. 2 and FIG. 3 and labeled in FIG. 3) are attached to the top side 212 of the top plate 202 and extending upward therefrom. The ear tab(s) 230 may be in the form of small vertical plates, upright posts, tabs, or other small upright structures. The purpose of the ear tab(s) 230 may be to facilitate the positioning of a separate apparatus (e.g., a vehicle jack) onto an optimal location on the top side 212 of the top plate 202 and generally hold the separate apparatus thereon.

In a preferable embodiment, the top plate 202 includes two ear tabs 230 as shown in FIG. 3, the two ear tabs 230 generally parallel with one another forming a gap therebetween within which the separate apparatus (e.g., a vehicle jack) may be positioned and held in place by the tabs 230. Accordingly, it may be preferable for a first ear tab 230 to be positioned on the top surface 212 of the top plate 202 near the top plate's 202's rear side 208, and a second ear tab to be positioned on the top surface 212 of the top plate 202 near the top plate's 202's front side 210. However, other numbers and/or arrangements of ear tabs 230 also is contemplated.

Support Arms Assembly 300

Figure 4:
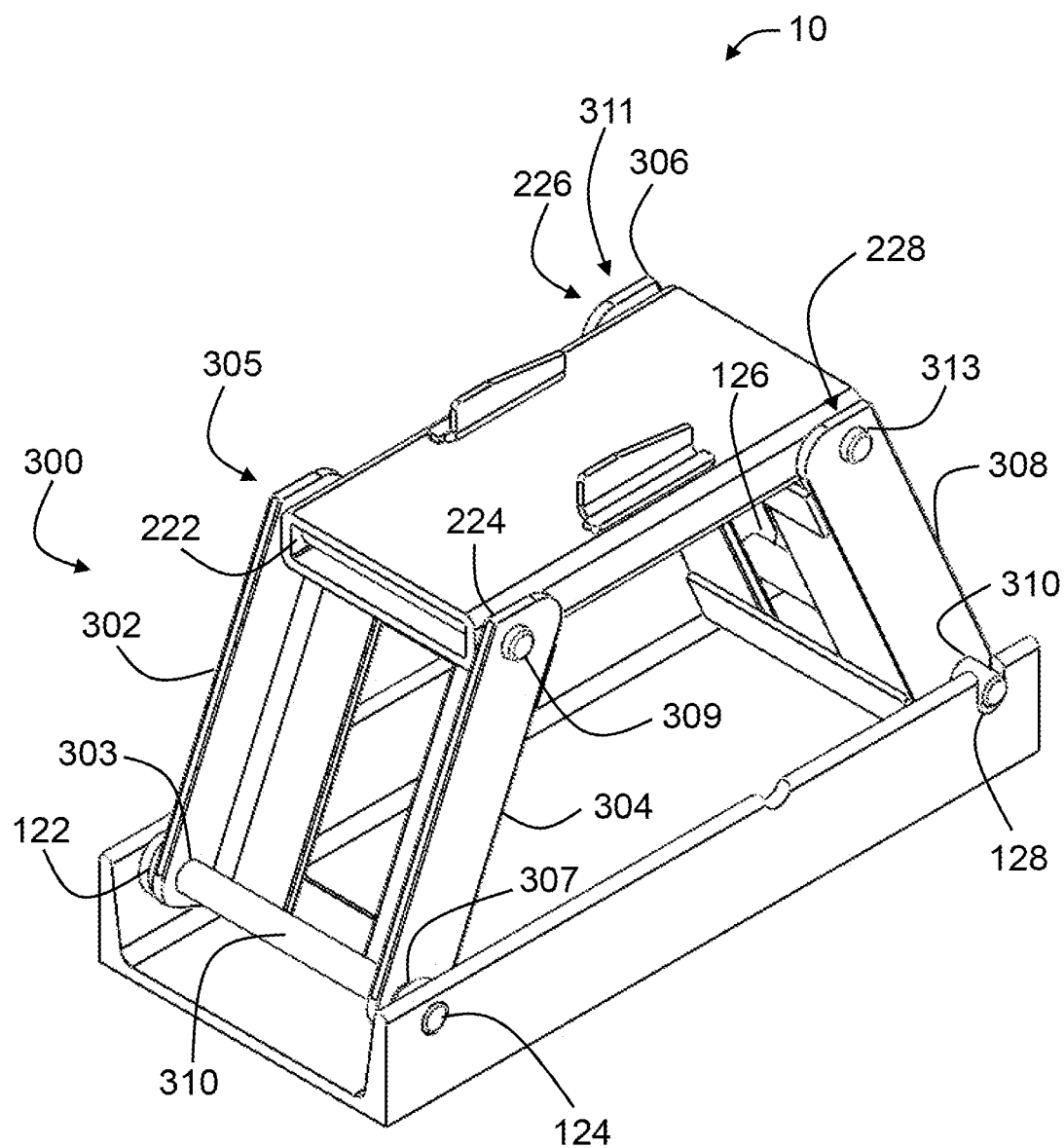
FIG. 4 shows aspects of a support arms assembly according to exemplary embodiments hereof.

In some embodiments as shown in FIG. 4, the support arms assembly 300 includes a first support arm 302, a second support arm 304, a third support arm 306, and a fourth support arm 308. In general, the support arms 302, 304, 306, 308 each extend between the base assembly 100 and the platform assembly 200 while providing support to each assembly 100, 200.

In some embodiments as shown in FIG. 2, the support arms 302, 304, 306, 308 may each comprise an elongate section of material (e.g., steel) with an L-shaped cross-section to provide strength and rigidity to the arms 302, 304, 306, 308. Other shaped cross-sections also are contemplated.

In some embodiments as shown in FIGS. 2 and 4, the first support arm 302 includes a first end with a first end aperture 303 rotatably coupled to the base assembly 100 at the base assembly's 100's first aperture 122, and a second end with a second end aperture 305 rotatably coupled to the platform assembly 200 at the platform assembly's 200's first aperture 222. Similarly, the second support arm 304 includes a first end with a third end aperture 307 rotatably coupled to the base assembly 100 at the base assembly's 100's second aperture 124 (as shown in FIG. 2 and FIG. 4), and a second end with a fourth end aperture 309 rotatably coupled to the platform assembly 200 at the platform assembly's 200's second aperture 224.

As shown in FIGS. 2 and 4, the third support arm 306 includes a first end releasably coupled to the base assembly 100 at the base assembly's 100's first notch 126, and a second end with a fifth end aperture 311 rotatably coupled to the platform assembly 200 at the platform assembly's 200's third aperture 226. Similarly, the fourth support arm 308 includes a first end releasably coupled to the base assembly 100 at the base assembly's second notch 128, and a second end with a sixth end aperture 313 rotatably coupled to the platform assembly 200 at the platform assembly's 200's fourth aperture 228.

As shown in FIGS. 2 and 4, the rotatable coupling between the first support arm's 302's first end aperture 303 and the base assembly's 100's first aperture 122 may be facilitated by a pin 310 passing through each aperture 303, 122, and the rotatable coupling between the first support arm's 302's second end aperture 305 and the platform assembly's 200's first aperture 222 may be facilitated by a pin 310 passing through each aperture 305, 222. Similarly, the rotatable coupling between the second support arm's 304's third end aperture 307 and the base assembly's 100's second aperture 124 may be facilitated by a pin 310 passing through each aperture 307, 124, and the rotatable coupling between the second support arm's 304's fourth end aperture 309 and the platform assembly's 200's second aperture 224 may be facilitated by a pin 310 passing through each aperture 309, 224. It may be preferable that the same pin 310 pass through the apertures 303/122 and 307/124 as shown in FIG. 4, but this may not be necessary. It also may be preferable that the same pin 310 pass through the apertures 305/222 and 309/224, but this also may not be necessary.

In addition, the releasable coupling between the third support arm 306 and the base assembly's 100's first notch 126 may be facilitated by a pin 310 (e.g., passing through an aperture in a first end of the third support arm 306 and resting in the notch 126), and the rotatable coupling between the third support arm's 306's fifth end aperture 311 and the platform assembly's 200's third aperture 226 may be facilitated by a pin 310 passing through each aperture 311, 226. Similarly, the releasable coupling between the fourth support arm 308 and the base assembly's 100's second notch 128 may be facilitated by a pin 310 (e.g., passing through an aperture in a first end of the fourth support arm 308 and resting within the notch 128), and the rotatable coupling between the fourth support arm's 308's sixth end aperture 313 and the platform assembly's 200's fourth aperture 228 may be facilitated by a pin 310 passing through each aperture 313, 228.

While the releasable coupling of the lower portions of the third and fourth support arms 306, 308 and the base assembly 100 have been described as utilizing respective pin(s) 310 and notch 126, 128 combinations, it is understood that other releasable coupling mechanisms may be used, such as, without limitation, detents, stops, pin/aperture combinations, other types of releasable coupling mechanisms, and any combinations thereof.

In some embodiments as shown in FIG. 2, the first and second support arms 302, 304 are coupled together using one or more support beams 232 extending between the arms 302, 304 (e.g., between the lower portion of the arms 302, 304, between the upper portions of the arms 302, 304, and/or anywhere therebetween). In this way, the first and second support arms 302, 304 may move as a unit. In other embodiments, the first and second support arms 302, 304 may be combined as a single support arm that fulfills the generally same functionalities.

Similarly, as shown in FIG. 2, the third and fourth support arms 306, 308 are coupled together using one or more support beams 232 extending between the arms 306, 308 (e.g., between the lower portion of the arms 306, 308, between the upper portions of the arms 306, 308, and/or anywhere therebetween). In this way, the third and fourth support arms 306, 308 may move as a unit. In other embodiments, the third and fourth support arms 306, 308 may be combined as a single support arm that fulfills the generally same functionalities.

The Assembly 10

Figure 5:
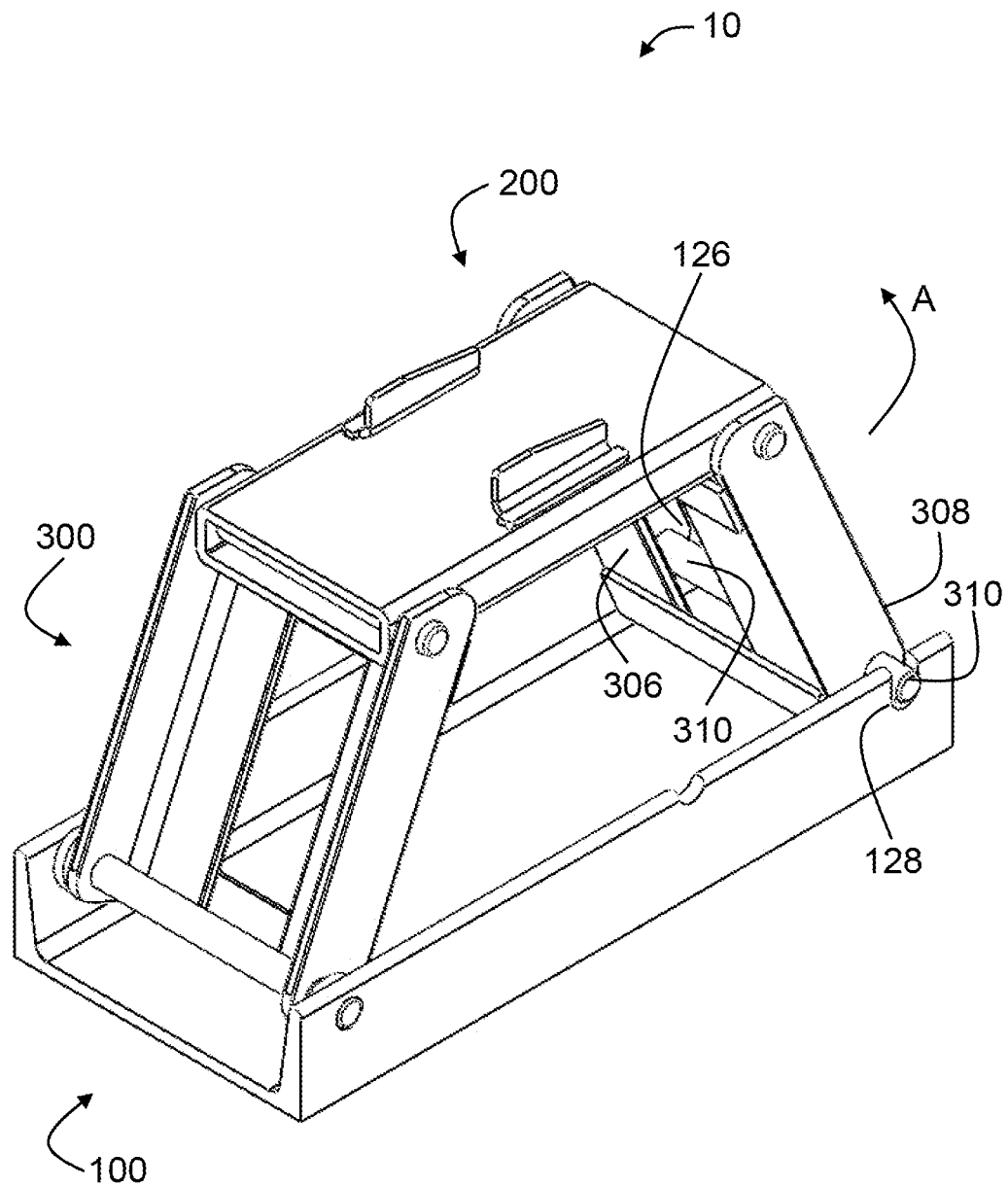
FIG. 5 show aspects of a foldable stand assembly in a first extended configuration according to exemplary embodiments hereof.
Figure 6:
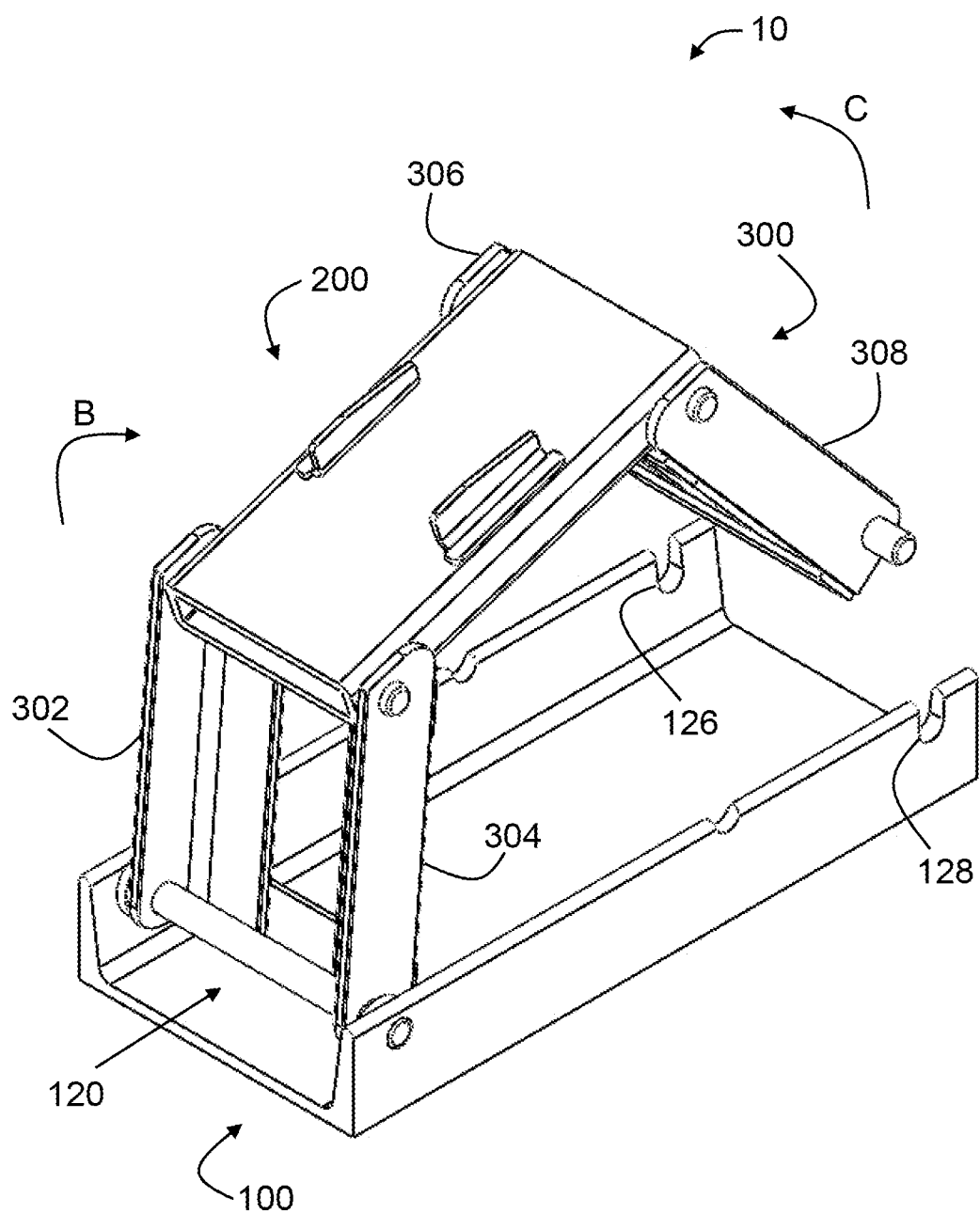
FIG. 6 shows aspects of a foldable stand assembly in the process of being transitioned from a first extended configuration to a second folded configuration according to exemplary embodiments hereof.
Figure 7:
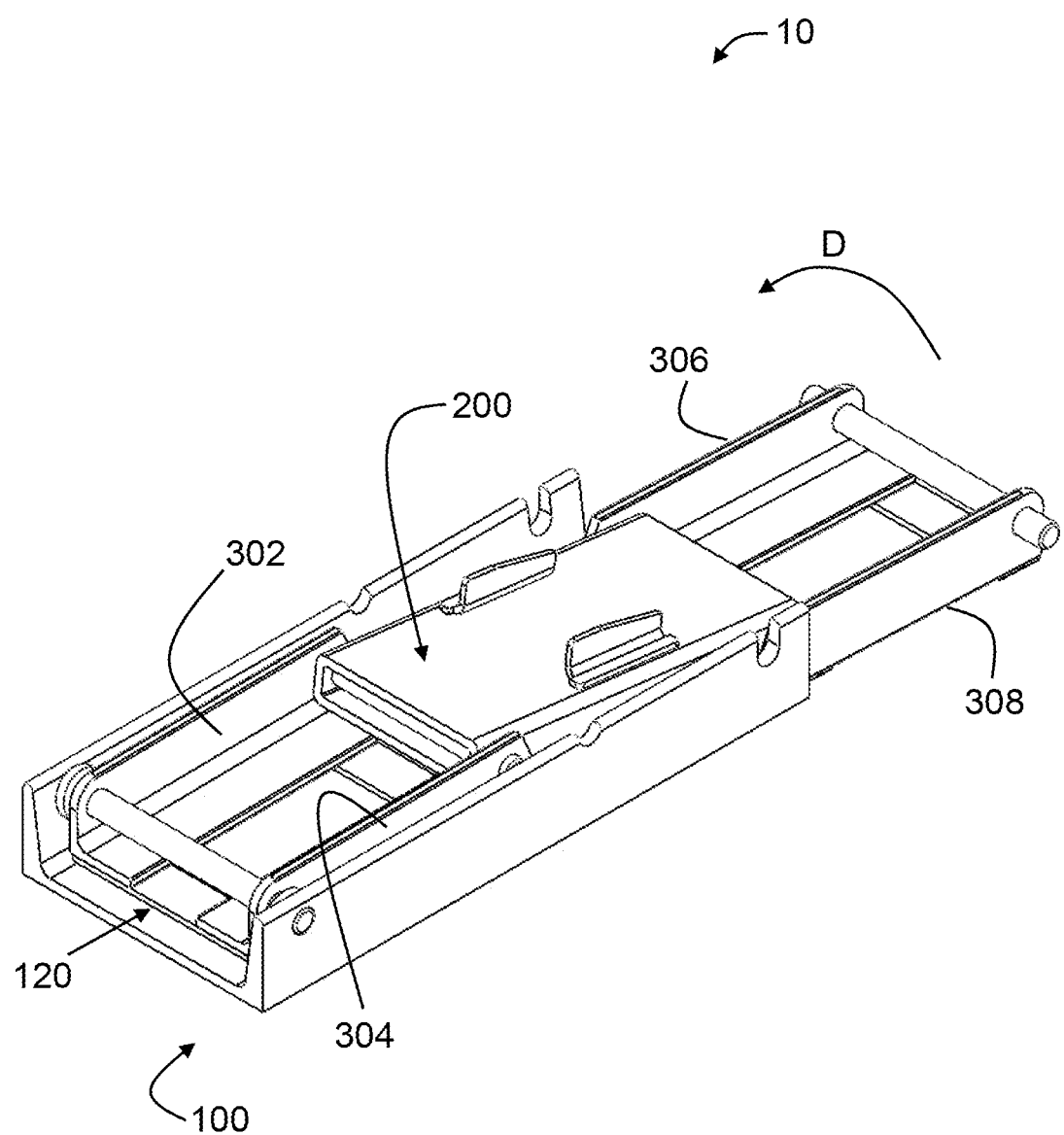
FIG. 7 shows aspects of a foldable stand assembly in the process of being transitioned from a first extended configuration to a second folded configuration according to exemplary embodiments hereof.
Figure 8:
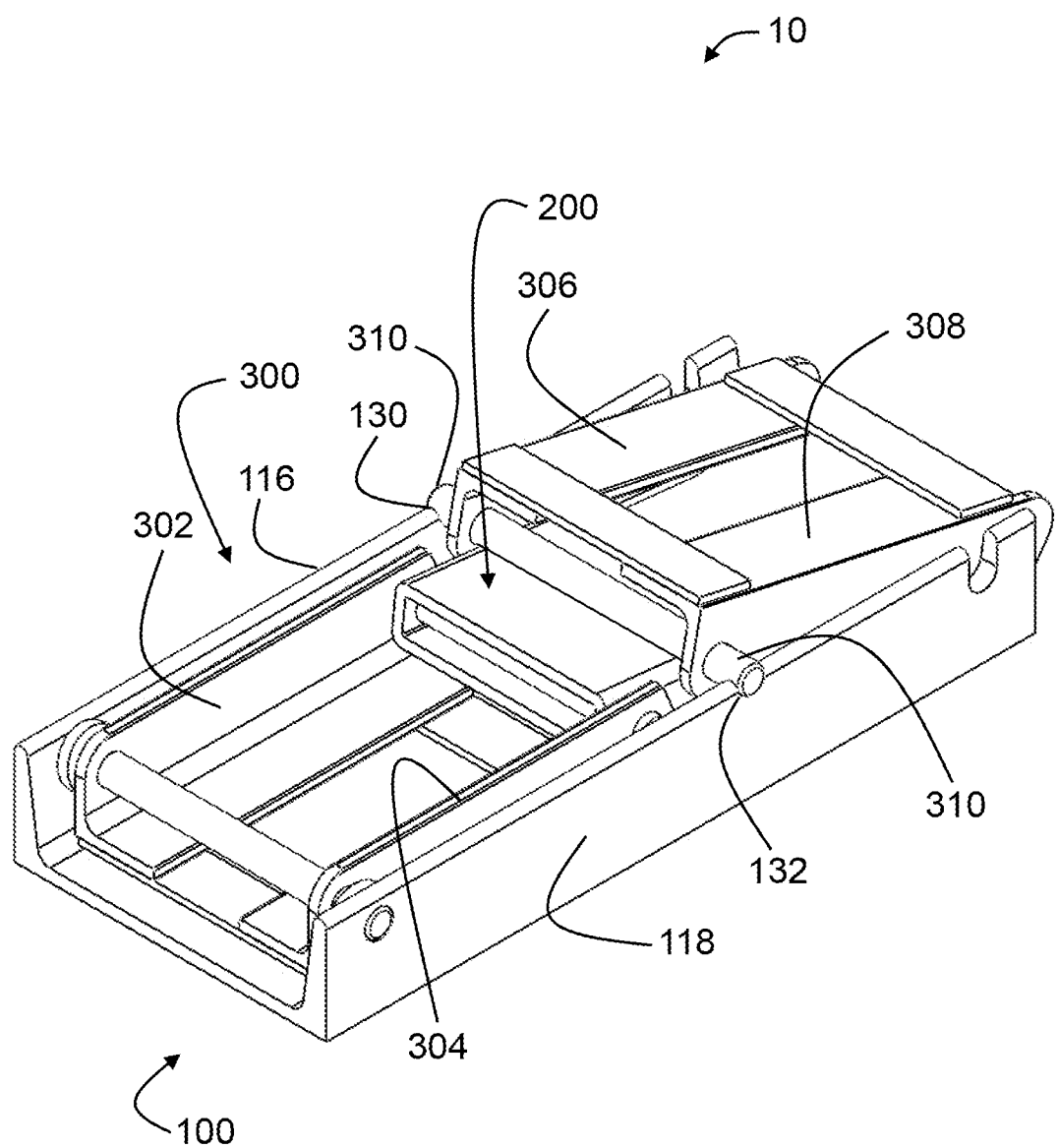
FIG. 8 shows a foldable stand assembly according transitioned to a second folded configuration according to exemplary embodiments hereof.

In some embodiments as shown in FIGS. 5-8, the assembly 10 is designed to transition from a first (extended) configuration for usage as a support stand shown in FIG. 5 to a second (folded) configuration for stowage as shown in FIG. 8.

To perform this transition, the platform assembly 200 and the third and fourth support arms 306, 308 of FIG. 5 may first be lifted in the direction of arrow A. This action may release the third and fourth support arms 306, 308 (e.g., the pin(s) 310) from the respective notches 126, 128 in the base assembly 100 resulting in the configuration shown in FIG. 6.

Next as shown in FIG. 6, the first and second support arms 302, 304 and the platform assembly 200 may be rotated to the right and downward in the direction of arrow B while the third and fourth support arms 306, 308 may be rotated upward in the direction of arrow C. As these actions are taken, the first and second support arms 302, 304 and at least a portion of the platform assembly 200 may be received into the base assembly's 100's channel 120 as shown in FIG. 7.

Next as shown in FIG. 7, the third and fourth support arms 306, 308 may be rotated in the direction of arrow D until third and fourth support arms 306, 308 generally abut against the platform assembly 200 as shown in FIG. 8. In some embodiments, the base assembly's 100 side walls 116, 118 may include notches 130, 132, respectively, that may receive a portion of the pin(s) 310 released from the notches 126, 128 in a prior step when this action is taken. This may result in the folded configuration (for stowage) shown in FIG. 8.

To transition the assembly from the second (folded) configuration shown in FIG. 8 to the first (extended) configuration of FIG. 5, the actions described above may be generally performed in reverse order.

In some embodiments, the assembly 10 is about 13.5" long, 6" wide, and about 1.5"-2" tall when fully collapsed. When fully extended upright, the assembly 10 is about 6" tall. It is understood that these dimensions are shown for demonstration and that the assembly 10 may be formed using any dimensions as required by its functionalities. It also is understood that the assembly 10 may be larger or smaller for other purposes, e.g., 10%, 20%, 30%, 40%, 50%, 60%, 70%, 80%, 90%, 100% or other percentages larger or smaller than the dimensions provided above.

In some embodiments as shown in FIG. 5, with the assembly 10 configured in its first (extended) position, the first and second support arms 302, 304 extend upward from the base assembly 100 from left to right at an angle of about 45°-85°, or preferable at an angle of about 55°-70°, or more preferably at an angle of about 60°, and the third and fourth support arms 306, 308 extend upward from the base assembly 100 from right to left at an angle of about 45°-85°, or preferable at an angle of about 55°-70°, or more preferably at an angle of about 60°.

It is understood that the steps described above are meant for demonstration and that additional steps may be performed, not all of the described steps may be performed, and the steps may be taken in different orders. It also is understood that the scope of the assembly 10 is not limited in any way by the steps taken during its use.

It also is understood that any aspect and/or element of any embodiment of the assembly 10 described herein or otherwise may be combined with any other aspect and/or element of any other embodiment described herein or otherwise in any way to form additional embodiments of the assembly 10 all of which are within the scope of the assembly 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A foldable stand assembly comprising:
    a base with a base first end, a base second end, and a U-shaped channel extending between the base first end and the base second end;
    a platform with a platform first end, a platform second end and a platform top side extending between the platform first end and the platform second end;
    at least one first elongate support arm with a first end rotatably coupled to the base first end and a second end rotatably coupled to the platform first end; and
    at least one second elongate support arm with a first end adapted to be releasably engaged with the base and a second end rotatably coupled to the platform second end;
    wherein the foldable stand transitions from a first configuration with the first end of the at least one second elongate support arm releasably engaged with the base, to a second configuration with the first end of the at least one second elongate support arm disengaged from the base and with the at least one first elongate support arm and at least a portion of the platform received into the U-shaped channel.

2. The foldable stand assembly of claim 1 wherein the base includes a rear side wall, a top side, and a front side wall that define the U-shaped channel.

3. The foldable stand assembly of claim 1 wherein the at least one first elongate support arm includes a total of two first elongate support arms, and the at least one second elongate support am includes a total of two second elongate support arms.

4. The foldable stand assembly of claim 3 wherein the total of two first elongate support arms are coupled together by a first support beam, and the total of two second elongate support arms are coupled together by a second support beam.

5. The foldable stand assembly of claim 1 wherein the first end of the at least one first elongate support arm is rotatably coupled to the base first end by a first pin passing through a first aperture in the base.

6. The foldable stand assembly of claim 1 wherein the second end of the at least one first elongate support arm is rotatably coupled to the platform first end by a second pin passing through a first aperture in the platform.

7. The foldable stand assembly of claim 1 wherein the first end of the at least one second elongate support arm is releasably coupled to the base by a first tab coupled to the first end of the at least one second elongate support arm and resting in a first notch in the base.

8. The foldable stand assembly of claim 7 wherein the first tab includes a third pin coupled to the first end of the at least one second elongate support arm.

9. The foldable stand assembly of claim 1 wherein the second end of the at least one second elongate support arm is rotatably coupled to the platform second end by a fourth pin passing through a second aperture in the platform.

10. The foldable stand assembly of claim 1 further comprising at least one ear tab coupled to and extending upward from the platform top side.

11. The foldable stand assembly of claim 10 wherein the at least one ear tab includes a total of two ear tabs, with a first ear tab coupled to the platform top side at a rear location on the platform top side and a second ear tab coupled to the platform top side at a forward location on the platform top side.

12. The foldable stand assembly of claim 1 wherein a cross-section of the at least one first elongate support arm includes an L-shaped cross-section.

13. The foldable stand assembly of claim 1 wherein a cross-section of the at least one second elongate support arm includes an L-shaped cross-section.

14. A foldable stand assembly comprising:
- a base with a base first end, a base second end, a base top side, a rear side wall extending upward from the base top side, a front side wall extending upward from the base top side, and a U-shaped channel defined by the rear side wall, the base top side, and the front side wall;
- a platform with a platform first end, a platform second end, and a platform top side extending between the platform first end and the platform second end;
- a first elongate support arm with a first end rotatably coupled to the base first end and a second end rotatably coupled to the platform first end;
- a second elongate support arm with a first end rotatably coupled to the base first end and a second end rotatably coupled to the platform first end;
- a third elongate support arm with a first end adapted to be releasably engaged with the base second end and a second end rotatably coupled to the platform second end; and
- a fourth elongate support arm with a first end adapted to be releasably engaged with the base second end and a second end rotatably coupled to the platform second end;
- wherein the foldable stand transitions from a first configuration with the first end of the third elongate support arm and the first end of the fourth elongate support arm releasably engaged with the base second end, to a second configuration with the first end of the third elongate support arm and the first end of the fourth elongate support arm disengaged from the base second end and with the first elongate support arm, the second elongate support arm and at least a portion of the platform received into the U-shaped channel.

15. The foldable stand assembly of claim 14 wherein the first end of the first elongate support arm and the first end of the second elongate support arm are rotatably coupled to the base first end by a first pin passing through a first aperture in the base first end.

16. The foldable stand assembly of claim 14 wherein the second end of the first elongate support arm and the second end of the second elongate support arm are rotatably coupled to the platform first end by a second pin passing through a second aperture in the platform first end.

17. The foldable stand assembly of claim 14 wherein the first end of the third elongate support arm is releasably coupled to the base second end by a first tab coupled to the first end of the third elongate support arm and resting in a first notch in the base second end, and the first end of the fourth elongate support arm is releasably coupled to the base second end by a second tab coupled to the first end of the fourth elongate support arm and resting in a second notch in the base second end.

18. The foldable stand assembly of claim 17 wherein the first tab and the second tab include a third pin coupled to the first end of the third elongate support arm and to the first end of the fourth elongate support arm.

19. The foldable stand assembly of claim 14 wherein the second end of the third elongate support arm and the second end of the fourth elongate support arm are rotatably coupled to the platform second end by a fourth pin passing through a third aperture in the platform second end.

20. The foldable stand assembly of claim 14 further comprising at least one ear tab coupled to and extending upward from the platform top side.

21. The foldable stand assembly of claim 20 wherein the at least one ear tab includes a total of two ear tabs, with a first ear tab coupled to the platform top side at a rear location on the platform top side and a second ear tab coupled to the platform top side at a forward location on the platform top side.

* * * * *